United States Patent [19]
Stella et al.

[11] Patent Number: 4,722,617
[45] Date of Patent: Feb. 2, 1988

[54] BALL BEARING ASSEMBLY

[75] Inventors: Leo Stella, Bristol; Edward F. De Vito, Torrington, both of Conn.

[73] Assignee: The Torrington Company, Torrington, Conn.

[21] Appl. No.: 75,478

[22] Filed: Jul. 17, 1987

[51] Int. Cl.⁴ .................. F16C 33/38; F16C 43/04; F16C 33/44

[52] U.S. Cl. .................. 384/523; 384/526; 384/539; 384/560; 384/614

[58] Field of Search .............. 384/523, 526–528, 384/534, 539, 572, 576, 614, 571, 510, 513, 514, 537, 559–561, 564, 584, 617, 623, 515, 609, 612

[56] References Cited

U.S. PATENT DOCUMENTS

| | | | |
|---|---|---|---|
| 2,969,266 | 1/1961 | Schaeffler | 384/564 |
| 3,477,773 | 11/1969 | Altson | 384/576 |
| 4,136,916 | 1/1979 | Musselman et al. | 384/560 |
| 4,541,742 | 9/1985 | Lederman | 384/526 X |
| 4,588,314 | 5/1986 | Anscher | 384/614 |

FOREIGN PATENT DOCUMENTS

| | | | |
|---|---|---|---|
| 1286343 | 1/1969 | Fed. Rep. of Germany | 384/564 |
| 2739367 | 10/1978 | Fed. Rep. of Germany | 384/576 |
| 0010140 | 1/1980 | Japan | 384/527 |
| 2115889 | 9/1983 | United Kingdom | 384/576 |

*Primary Examiner*—Stuart S. Levy
*Assistant Examiner*—Thomas R. Hannon
*Attorney, Agent, or Firm*—Frank S. Troidl

[57] ABSTRACT

The ball bearing assembly includes an outer race, an inner race, and a ball cage. The cage is molded of a resilient plastic material and has features located on one rim which retains the outer race and inner race in the assembly.

7 Claims, 6 Drawing Figures

BALL BEARING ASSEMBLY

This invention relates to ball bearing assemblies. More particularly, this invention is a novel ball bearing assembly including inner and outer races formed from metal strip and a resilient plastic cage.

Angular contact bearings are constructed to carry radial and axially directed thrust loads. For some applications, a bearing cage is used to retain the alignment of balls between the curved raceways of the inner and outer races. It is useful to have a unitized bearing assembly in which the races, balls, and bearing cage, once assembled, are held together as a unit prior to incorporation of the bearing assembly into some other assembly A convenient and inexpensively manufactured ball bearing assembly includes a resilient ball cage which is made by a one-step injection molding process. An example of such a ball bearing assembly is disclosed in U.S. Pat. No. 4,588,314 dated May 13, 1986 by Joseph Anscher and entitled "Bearing Cage".

The ball bearing assembly of this invention also utilizes a ball cage which is made by a molding process and utilizes inner and outer races which are formed from flat strip stock. The inner race, outer race, and cage of this invention provides a ball bearing assembly of different and improved structure when compared to currently made ball bearing assemblies such as that disclosed in U.S. Pat. No. 4,588,314.

Briefly described, this inventin is a ball bearing assembly comprising an annular outer race, an annular inner race, and an annular resilient cage. The annular resilient cage has a plurality of circumferentially spaced ball pockets containing balls and a pair of axially separated annular rims.

An annular extension is integrally connected to one of the rims by an annular shoulder. The outside diameter of the annular extension is less than the outside diameter of the rim to which it is connected. The outer race has an annular ball raceway and an inner surface portion overlapping the cage annular shoulder. The inside diameter of the radially innermost edge of said inner surface portion is less than the outside diameter of the annular resilient cage rim. The annular inner race has a ball raceway in confronting relation to the outer race ball raceway. The inside diameter of the cage annular extension is more than the outside diameter of the inner race. At least one retention means extends from the annular extension and overlapping an axial end of the inner race. The resiliency of the annular resilient cage is such that the bearing assembly may be assembled by pushing the cage past said outer race inner surface portion and snapping the inner race past the cage retention means.

The invention, as well as its many advantages, may be further understood by reference to the following detailed description and drawings in which.

In the various figures, like parts are referred to by like numbers.

Figure 1:
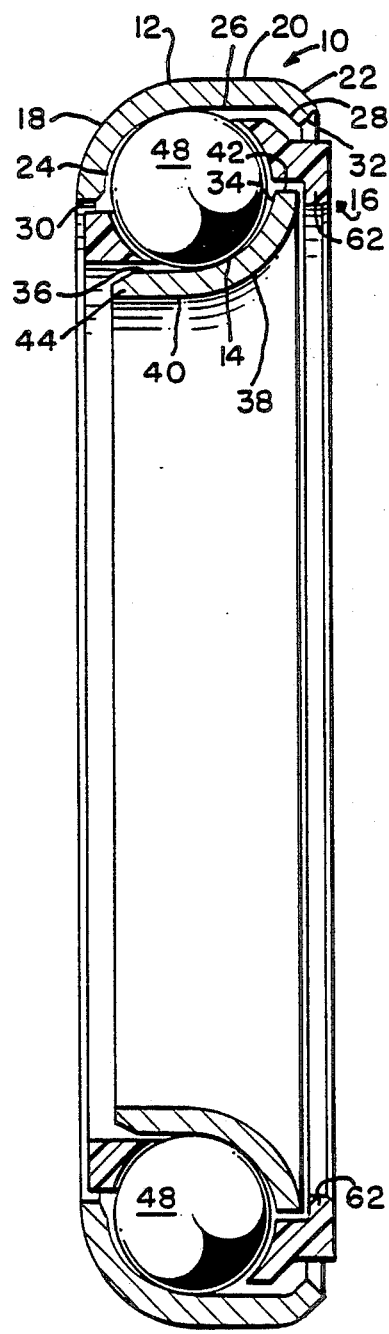
FIG. 1 is a sectional view of a preferred embodiment of ball bearing assembly.

Referring to the drawings and more particularly to FIG. 1 the ball bearing assembly indicated generally by the numeral 10 comprises a sheet metal annular outer race 12 and a sheet metal annular inner race 14 in which is fitted an annular resilient plastic cage indicated generally by the numeral 16.

The thickness of the outer race is substantially the same throughout its length; also the thickness of the inner race 14 is substantially the same throughout its length. The annular outer surface of the outer race has an inwardly curved annular portion 18 at one end and a first annular straight portion 20 extending axially from the inwardly curved portion. A second annular straight portion 22 extends axially away from the straight portion 20 and radially inwardly at an acute radially inwardly at an acute angle of, say 45°, with a plane along the straight portion 20.

The inner annular surface of the outer race 12 has an inwardly curved annular portion 24 at one end and an annular straight portion 26 extending axially from the inwardly curved annular portion 24. A second annular straight portion 28 extends axially away from the straight portion 26 and inwardly at an acute angle of, say 45°, with a plane along the straight portion 26.

The free end of the annular curved surfaces 18 and 24 are interconnected by the perpendicular axially extending interconnecting surface 30. The free ends of the inner and outer surfaces 22 and 28 are interconnected by the perpendicular interconnecting surface 32.

The inner race 14 has an annular outer surface including an outwardly curved portion 34 at one end and an annular straight portion 36 extending axially from the outwardly curved portion 34. The inner surface of the inner race has an outwardly curved portion 38 at one end and an annular straight portion 40 extending axially from the outwardly curved portion 38. The free ends of the outwardly curved portions 34 and 38 are interconnected by the axially extending annular surface 42. The free ends of the axially extending portions 36 and 40 are interconnected by the radially extending annular surface 44.

The inner race outwardly curved portion 34 is axially spaced from the outer race inner surface curved portion 24. The straight portions of the outer race extend in one axial direction from its curved portions. The straight portions of the inner race extend in the other axial direction from its curved portions. The inner race outer surface curved portion 34 is a ball raceway in confronting relation to the outer race inner annular curved portion 24.

Figures 4, 5, 6:
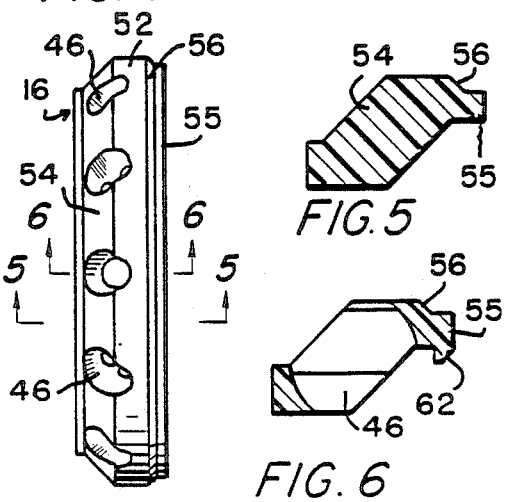
FIG. 4 is a side view of the resilient cage of Figs. 1 through 3.
FIG. 5 is a sectional view taken along lines 5—5 of FIG. 4 and in the direction of the arrows.
FIG. 6 is a sectional view taken along lines 6—6 of FIG. 4 and in the direction of the arrows.

The resilient annular plastic cage 16 has a plurality of circumferentially equally spaced ball pockets 46 (see FIG. 4) with a ball 48 (see FIG. 1) in each pocket.

The resilient annular cage 16 has an inner rim 50 which is axially separated from outer rim 52 and an interconnecting shoulder 54 having the pockets 46 circumferentially spaced therein. The pockets extend into the inner rim 50 and outer rim 52.

An annular extension 55 is integrally connected to the outer rim 52 by an annular shoulder 56. The annular extension 55 extends axially from the outer race 10 bore and is of less outside diameter than the rim 52.

The annular shoulder 56 extends parallel to and is overlapped by the outer race annular slanted inner surface 28. The outer rim portion 52 is of greater diameter than the smallest inside diameter of the slanted surface 28.

The axially extending inside surface 60 of annular extension 55 extends parallel to and over the axially extending surface 42 interconnecting the ends of the inner race outwardly curved portions 34 and 38. A plurality of retention tabs 62 extend radially inwardly from the annular extension inside surface 60 of the outer rim 52 and overlaps the inner race inner surface outwardly curved portion 38. The circumferentially separated retention tabs 62 are each aligned with a corresponding ball pocket 46.

Figure 2:
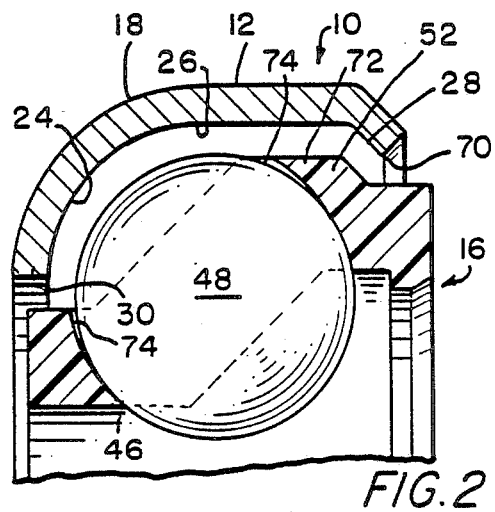
FIG. 2 is an enlarged fragmentary sectional view of the assembled outer race and cage and ball assembly before the inner race is inserted past the tabs of the resilient annular cage.

In assembling the bearing, the resiliency of the cage 16 allows it to be pushed past the radially innermost edge 70 (see FIG. 2) of the angled surface 28. This may be done either before or after the insertion of the balls 48 into the cage pockets 46. The cage pockets are shaped so that after the balls are snapped into the pockets, the balls are fully retained in the cage, even in the disassembled condition. The interference provided between the cage rim 52 outside diameter and the edge 70 of the outer race inside surface angle portion 28 is sufficient to unitize the cage and the outer race 10. A clearance 74 is provided in the cage pockets to allow the balls to drop radially inward as shown in FIG. 2 so that the diameter over the balls 48 is slightly smaller than the inside diameter of the edge 70 of the angled portion 28.

Figure 3:
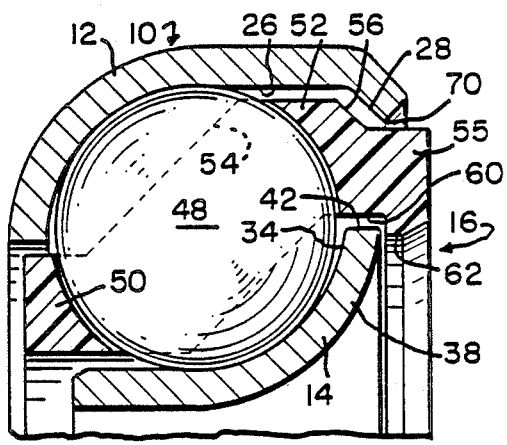
FIG. 3 is an enlarged fragmentary sectional view of the completed assembled ball bearing assembly of FIG. 1.

The final assembly step is to push the inner race 14 onto the position as shown in FIG. 1 and FIG. 3 by snapping its outer diameter past the cage retaining tabs. The inner race is now secured to the assembly and as such forces the balls 48 radially outward to their operating contact positions as shown in FIG. 3. The diameter over the balls at this position, is now greater than the inside diameter of the edge 70 of the angled portion 28 of the outer race and provides retention of the outer race 12 to the assembly also.

We claim:

1. A ball bearing assembly comprising: an annular outer race; an annular inner race; and an annular resilient cage, the annular resilient cage having a plurality of circumferentially spaced ball pockets, a pair of axially separated annular rims, an annular extension, and an annular shoulder integrally interconnecting the annular extension and one of said rims, the outside diameter of the annular extension being less than the outside diameter of the rim to which it is connected; a ball in each pocket; the outer race having an annular ball raceway and an inner surface portion overlapping the cage annular shoulder, the inside diameter of the radially innermost edge of said inner surface portion being less than the outside diameter of the annular resilient cage rim; the annular inner race having a ball raceway in confronting relation to the outer race ball raceway, the inside diameter of the cage annular extension being more than the outside diameter of the inner race, said cage annular extension having at least one retention means extending from the annular extension and overlapping an axial end of the inner race, the resiliency of the annular resilient cage being such that the bearing assembly may be assembled by pushing the cage past said outer race inner surface portion and snapping the inner race past the cage retention means.

2. A ball bearing assembly in accordance with claim 1 wherein: the retention means are a plurality of circumferentially separated retaining tabs.

3. A ball bearing assembly in accordance with claim 2 wherein: there is one retaining tab aligned with each cage pocket.

4. A ball bearing assembly in accordance with claim 3 wherein: the cage annular shoulder is parallel to said outer race inner surface portion.

5. A ball bearing assembly in accordance with claim 4 wherein: said outer race inner surface portion extends at an acute angle to a horizontal plane through it.

6. A ball bearing assembly in accordance with claim 5 wherein: said outer race inner surface portion extends at an angle of approximately 45° to a horizontal plane through it.

7. A ball bearing assembly comprising: a sheet metal annular outer race having annular inner and outer surfaces, each having an inwardly curved annular portion at one end, a first annular straight portion extending axially from the inwardly curved annular portion and a second annular straight portion extending axially away from the first annular straight portion and radially inwardly at an angle of approximately 45° with a plane along the appropriate first straight portion, the inner annular curved portion being a ball raceway and the two ends of the annular inner and outer surfaces each being interconnected by a surface perpendicular to the annular inner and outer surfaces; a coaxial sheet metal inner race having annular inner and outer surfaces, each having an outwardly curved portion at one end and an annular straight portion extending axially from the outwardly curved portion, the free ends of the outwardly curved portions being interconnected by an axially extending surface, the free ends of the straight portions being interconnected by a radially extending surface, the inner race outwardly curved portions being axially spaced from the outer race curved portions with the adjacent axially extending annular straight portions of the inner race and the adjacent axially extending annular straight portions of the outer race extending in opposite axial directions from their respective curved portions, the inner race outer annular curved portion being a ball raceway in confronting relation to the outer race inner annular curved portion; an annular resilient plastic cage having an inner rim and an outer rim, an annular interconnecting shoulder having a plurality of circumferentially equally spaced ball pockets therein and extending into the inner and outer rims, an annular extension, and an annular shoulder integrally interconnecting the annular extension and the outer rim, the annular extension extending axially from the outer race bore and of less outside diameter than the outer rim, the annular shoulder extending parallel to and overlapped by the outer race annular inner surface portion extending at an angle of approximately 45° with a plane along the appropriate first straight surface, the annular extension inside surface extending parallel to and over the axially extending surface interconnecting the ends of the inner race outwardly curved portions; and a plurality of retention tabs, one tab aligned with each pocket, extending radially inwardly from said annular extension inside surface, each tab having a surface extending radially from the annular extension inside surface and overlapping the inner race inner surface outwardly curved portion, the resiliency of the plastic cage being such that the bearing assembly may be assembled by pushing the cage past the outer race angled portion and snapping the inner race past the cage retention tabs.

* * * * *